F. MLADINICH AND A. R. DE TARTAS.
COMBINED MOVING PICTURE CAMERA AND PROJECTOR.
APPLICATION FILED MAR. 18, 1919.
1,369,694.
Patented Feb. 22, 1921.
4 SHEETS—SHEET 2.
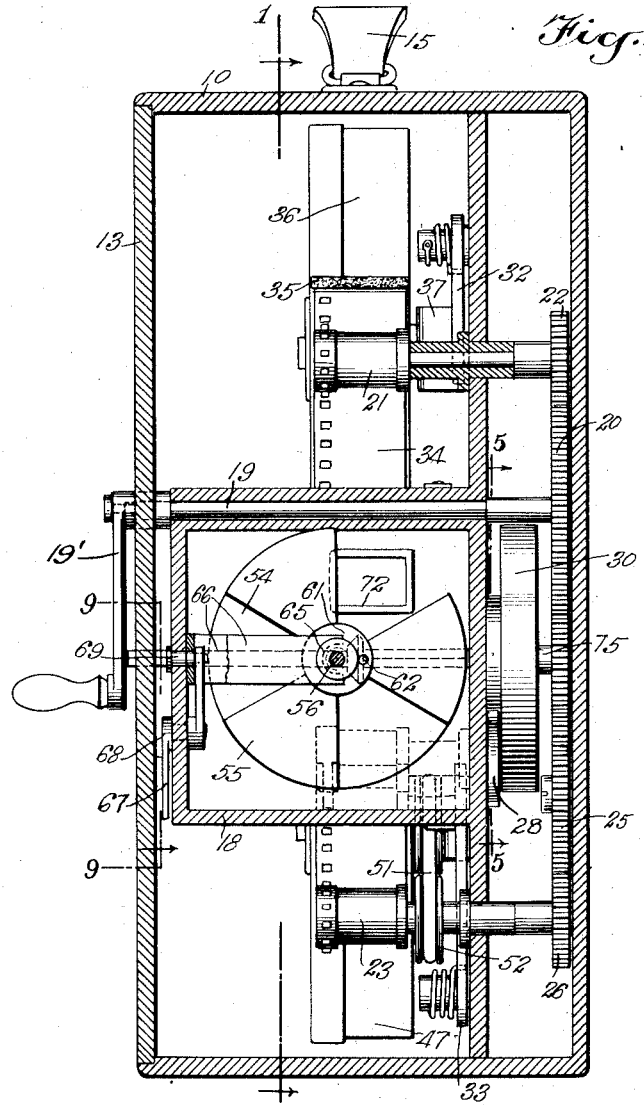
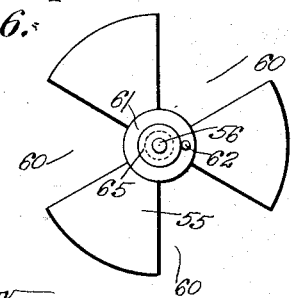
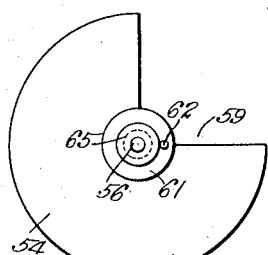
WITNESSES
INVENTORS
Frank Mladinich
Augustus R. de Tartas
BY
ATTORNEYS F. MLADINICH AND A. R. DE TARTAS.
COMBINED MOVING PICTURE CAMERA AND PROJECTOR.
APPLICATION FILED MAR. 18, 1919.
1,369,694.
Patented Feb. 22, 1921.
4 SHEETS—SHEET 3.
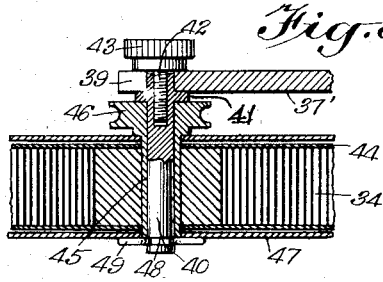
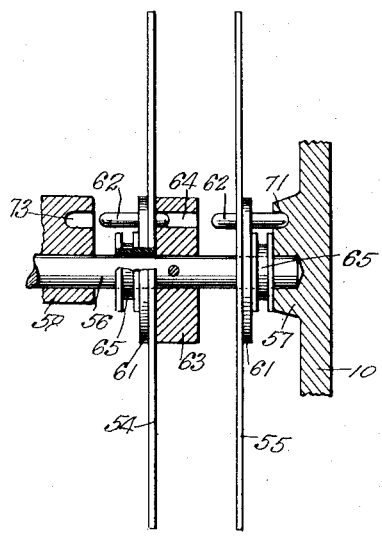
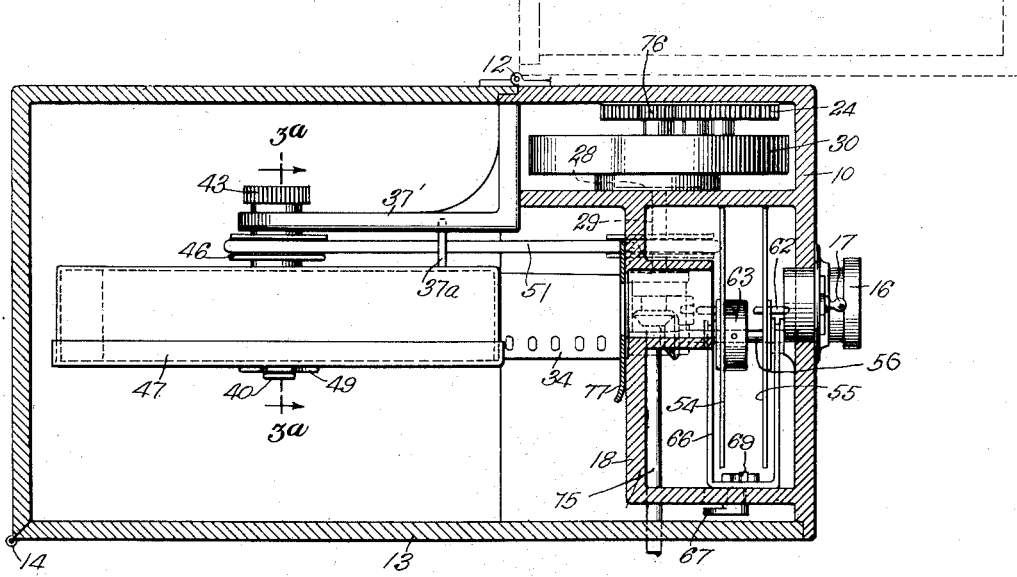
WITNESSES
INVENTORS
Frank Mladinich
Augustus R. de Tartas
BY
ATTORNEYS

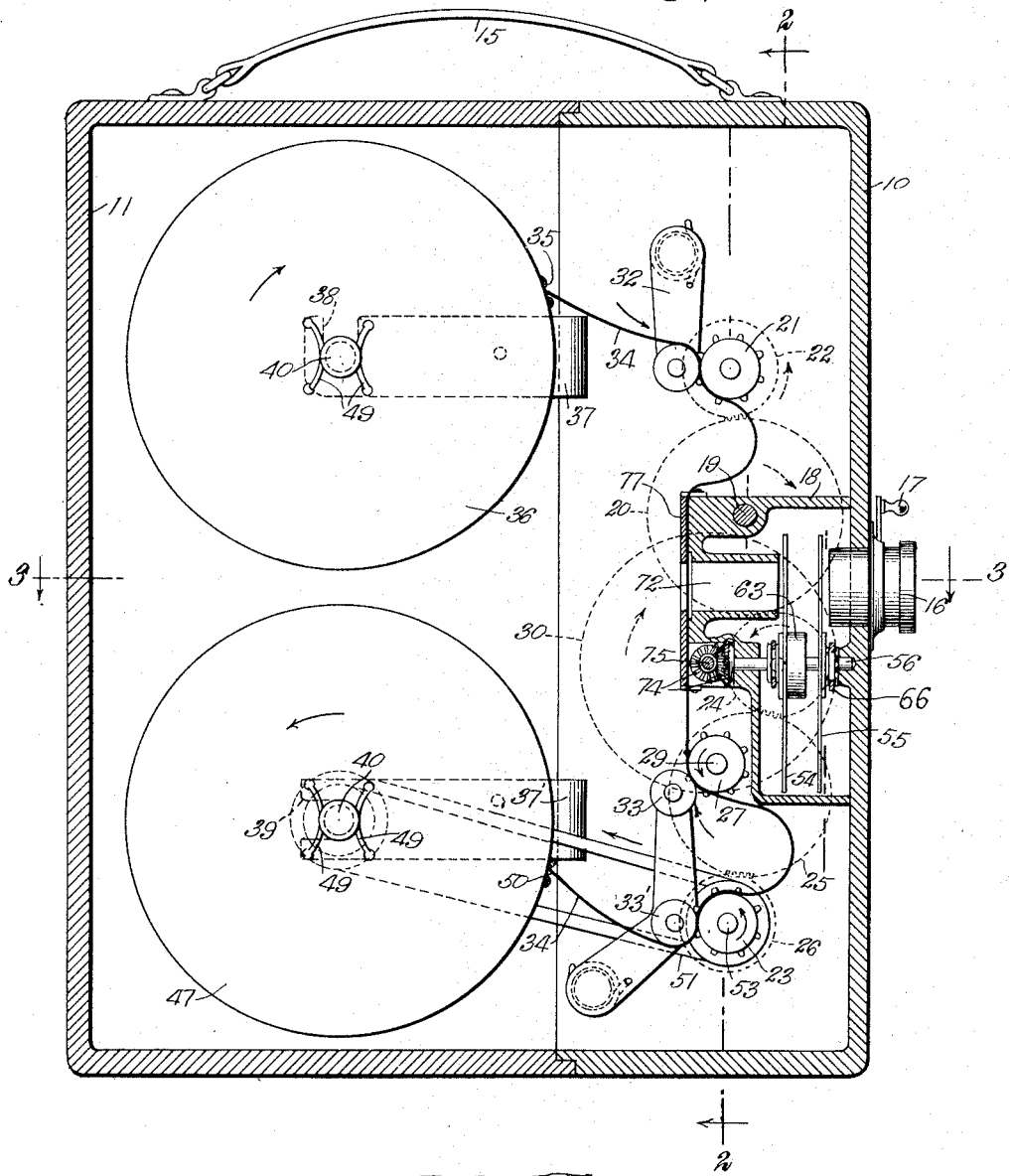
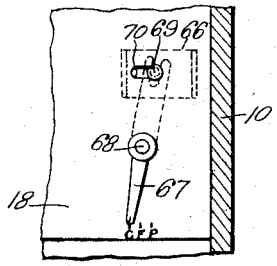

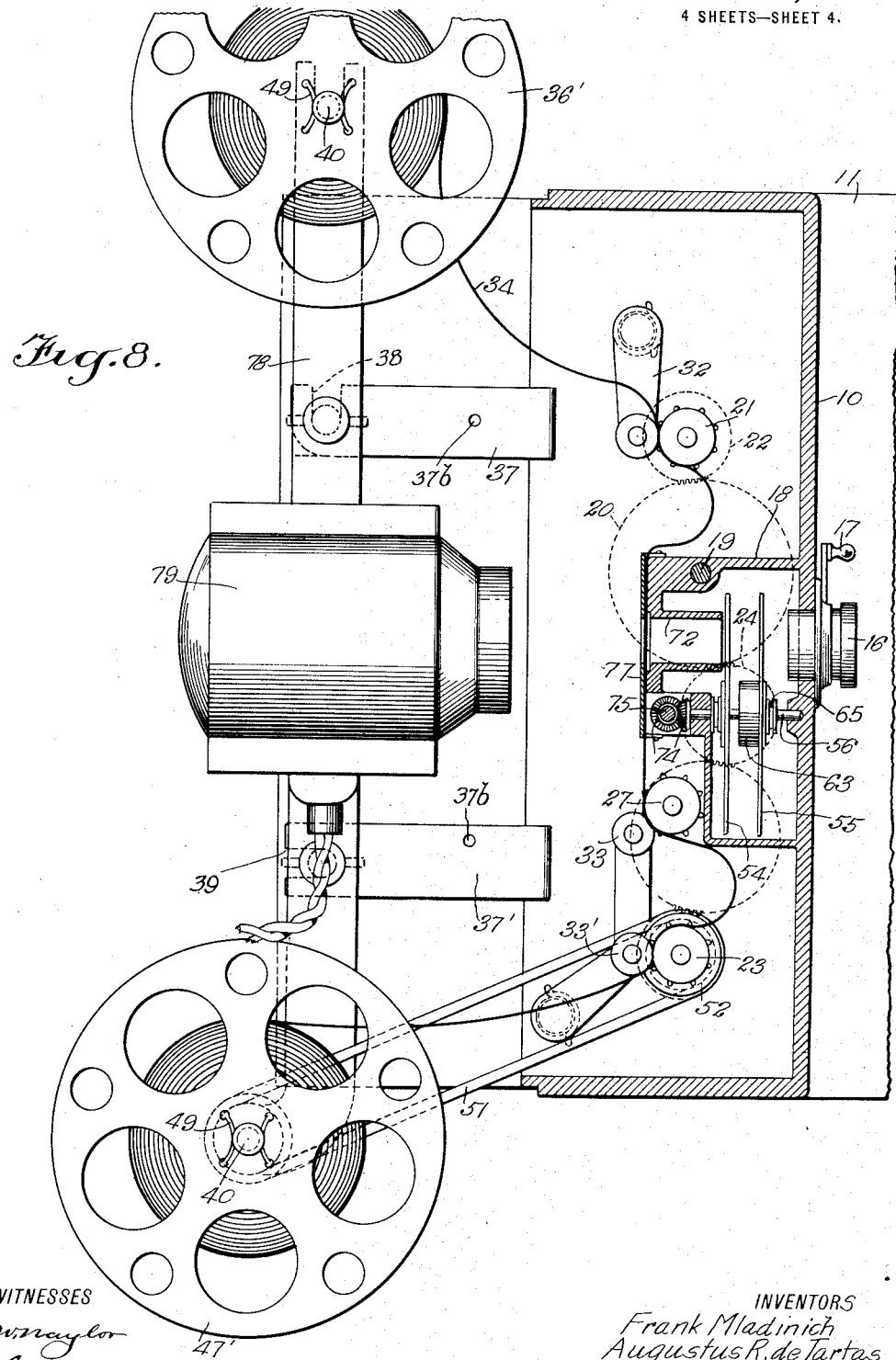

UNITED STATES PATENT OFFICE.

FRANK MLADINICH AND AUGUSTUS R. DE TARTAS, OF ROCKVILLE CENTER, NEW YORK, ASSIGNORS OF FIFTEEN ONE-HUNDREDTHS TO ELMER PONTIN, OF ELIZABETH, NEW JERSEY.

COMBINED MOVING-PICTURE CAMERA AND PROJECTOR.

1,369,694.  Specification of Letters Patent.  Patented Feb. 22, 1921.

Application filed March 18, 1919. Serial No. 283,322.

*To all whom it may concern:*

Be it known that we, FRANK MLADINICH and AUGUSTUS R. DE TARTAS, citizens of Servia and the United States, respectively, and residents of Rockville Center, in the county of Nassau and State of New York, have invented a new and Improved Combined Moving-Picture Camera and Projector, of which the following is a full, clear, and exact description.

This invention relates to photography, and has particular reference to moving picture apparatus.

Among the objects of the invention is to provide a combined photographic camera and moving picture projecting apparatus of such a nature as to adapt it for ready and satisfactory use by an amateur.

Another object of the invention is to provide a moving picture camera suitable to be carried by tourists or the like in place of an ordinary camera or kodak, the apparatus being of a small and compact nature suitable to be so carried and adapted to be manipulated at any time for the purpose of photographing animated pictures as occasion may warrant.

A further object is to provide an apparatus of the character indicated suitable for the projection of an animated picture at any time after the development of the film, the same mechanism being employed for both purposes with the exception of the rearrangement of the film holders or reels and a simple shift of the shutter member.

A still further object of this improvement is to provide in a combined motion picture camera and projector a novel construction of shutter mechanism having simple and reliable facilities for manipulating two different types of shutters in alternation, one for use in connection with the camera and the other for use in connection with the projector, means also being provided to lock both shutter devices stationary while the operator is focusing the instrument.

A still further object is to provide a motion picture apparatus which we have proved to be efficient and reliable in practice, but in which a film only one half the width of the standard film is required, and hence our improvement is adapted for the use of a standard film divided along its longitudinal center whereby the films for our device may be obtained readily on the open market and economically employed for the purposes of this invention.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical sectional view substantially on the line 1—1 of Fig. 2.

Fig. 2 is a vertical transverse section on the broken line 2—2 of Fig. 1.

Fig. 3 is a horizontal section on the line 3—3 of Fig. 1 indicating in dotted lines the rear portion of the casing swung around in the position thereof when the machine is used as a projector.

Fig. 3ª is a sectional detail on the line 3ª—3ª of Fig. 3.

Fig. 4 is a detail view of the shutter mechanism, and means for holding the shutters stationary.

Fig. 5 is a detail view of the Geneva movement for actuating the film feed, the view being taken from the line 5—5 of Fig. 2.

Figs. 6 and 7 are detail face views of the projector and camera shutters respectively.

Fig. 8 is a vertical sectional view of the device corresponding to the view of Fig. 1, but adjusted for use as a projecting machine; and Fig. 9 is a detail view of the indicator and shutter controller on the line 9—9 of Fig. 2.

Referring now more specifically to the drawings we show a motion picture apparatus comprising a casing having relatively fixed and movable front and rear parts 10 and 11 respectively hinged to swing around a vertical axis 12 as shown in Fig. 3. The meeting edges of the rigid portions of the frame are preferably rabbeted so as to render the same prefectly light-proof. At one side of the casing is provided a panel or door 13 adapted to open around a vertical axis 14 for the purpose of giving access to the interior of the casing for the interchange of films or film casings without swinging the part 11 of the casing on its hinges 12. A handle 15 is shown attached to the upper part of the casing for the convenient transportation of the device in place of an ordinary medium sized kodak.

A special type of lens 16 is provided which is used for taking a photograph and again for projecting a photograph, and it is provided with a convenient diaphragm 17 and focusing device.

Fixed within the casing part 10 and in communication with the lens devices is a frame 18 in which a shutter mechanism is housed, and which also provides bearing supports for a portion of the operating mechanism.

19 indicates the main power or crank shaft journaled in the upper portion of the frame 18 and provided at one end with a master wheel 20 which operates just within the left side panel of the fixed casing 10. The crank 19', or its equivalent, coöperates with the other end of the shaft and typifies any convenient means for rotating the shaft and master wheel.

The upper film sprocket 21 is operated from the master wheel 20 by means of a gear 22, and the lower film sprocket 23 is operated from the same source through a series of gears 24, 25, and 26 suitably proportioned to impart the same speed to the two sprockets. The roller or sprocket for feeding the film step by step is indicated at 27, the same being rotated intermittently by means of a star wheel 28 connected to the same shaft 29, the star wheel being a part of the Geneva movement including the balance wheel 30 having a pin 31 coöperating in a well known manner with the star wheel. Any suitable spring operated tension devices 32 and 33 may be employed to coöperate with the sprocket wheels to maintain a proper coöperation between the film and the sprockets.

The film 34 in the use of the device as a motion picture camera is withdrawn through a slot 35 in the front wall of the upper casing 36, shown as supported upon a rigid bracket or arm 37 extending rearward from the fixed casing part 10, the same being provided with an open topped notch 38 adjacent to its rear end. Below the arm 37 is a similar arm 37' having a notch 39 directly in its rear end. In other words the notch 38 opens upward while the notch 39 opens rearward. Fig. 3ª indicates a suggestion of a practical means for supporting a film reel casing. This means includes a spindle 40 having a shoulder 41 bearing against one face of the notched arm, said spindle being tapped to acommodate a set screw 42 having a milled head 43 bearing against the other side of the arm and so clamping the spindle in rigid position. The film reel 44 is journaled upon the spindle or upon a sleeve 45 having a belt wheel 46 having reference now particularly to the take-up reel in the lower casing 47. The free end of the spindle 40 is provided with a groove 48 into which springs 49 are adapted to snap for the purpose of making an easy and reliable lock to hold the lid portion of the reel casing in place and the entire reel on the spindle. After passing around the tension roller 33' the film is led through a slot 50 inward into the casing 47, a belt 51 operating over the pulley 46 from a similar pulley 52 on the shaft 53 of the lower sprocket 23 to rotate the take-up reel.

Referring now to Figs. 4, 6, and 7 we indicate two shutters 54 and 55 mounted coaxially upon a shaft 56 journaled in fixed bearings 57 and 58 in the shutter frame 18. The shutter 54 constitutes substantially three-quarters of a disk having a single opening 59 and is the one we use in the application of the invention as a camera. The other shutter, adapted for use in connection with the machine as a projector, has three sector-shaped openings 60. Each of these shutters is secured to a hub 61, and through the rim of the hub and the shutter disk projects a clutch pin 62. Between the shutters a clutch hub 63 is fixed to the shaft 56 and constitutes a driver for either shutter while the other remains stationary. This clutch hub 63 is provided with a hole or socket 64 into which either pin 62 is adapted to project. Each of the shutter hubs 61 is provided with a grooved yoke collar 65. 66 represents a double yoke member of U-form (see Fig. 2) the base of which is fitted slidably against the inner surface of the wall of the shutter frame adjacent to the door 13 (see Figs. 3 and 9). The free ends of the U-shaped yoke member have constant engagement in the grooves of the hub collars 65 and so the shutters are always held at the same distance apart and are adjustable simultaneously lengthwise of the shaft 56. 67 is a combined indicator and adjustment member journaled at 68 to the wall of the shutter frame just referred to, that portion of the indicator on the outside of the wall of the shutter frame acting as a finger piece and pointer coöperating with two extreme graduation marks C and P to represent respectively camera and projector. The inner and opposite end of the adjustment lever is on the inside of said wall and has forked engagement with a pin 69 extending through the base portion of the yoke 66 and operating through a slot 70 in the frame wall. The bearing 57 has a socket 71 into which the pin 62 of the shutter 55 projects when the device is used as a camera, the upper end of the lever 67 at this time being inclined toward the lens as in Fig. 9 the shutter 55 thus being held stationary, being prevented from axial movement by the yoke 66 and from rotation by means of the pin 62, one of the openings 60 of said shutter being at this time in registry with the picture field 72 formed in or through the shutter frame 18. When, however, the indicator lever 67 is moved to its opposite position pointing to the mark P the yoke 66 is shifted away from the lens bringing the pin 62 of the shutter 55 into the socket 64 of the hub 63 and the pin 62 of the other shutter into a socket 73 in the other fixed bearing 58 whereby the shutter 54 will be held stationary during the operation of the shutter 55 in connection with the projecting mechanism. As indicated in Fig. 4 these shutter controlling devices are so proportioned that when the indicator is in its mid position the shutters are both locked from rotation in the respective sockets 71 and 73 insuring a clear range of vision through the field 72 for focusing purposes.

The shaft 56 carrying the clutch hub 63 for rotation of the shutters at high speed is operated through miter gears 74 from a shaft 75 to which the balance wheel 30 is connected and operated from a small pinion 76 driven from the intermediate gear 24 previously described. In order to hold the reel casings 36 and 47 stationary we may employ any suitable expedient such as a pin 37ª projecting laterally from the casing into a socket or hole 37ᵇ formed in the arm 37 or 37'.

With the device arranged as shown in Fig. 1 and already described, it is adapted for operation as a moving picture camera which though of miniature size is thoroughly efficient and practical for either amateur or professional use. The film 34 is guided along the picture field 72 between the frame 18 and the film keeper 77 through the operation of the film actuating devices above described from the reel casing 36 to the reel casing 47. After a film has been exposed a fresh film may be substituted in an obvious manner by opening the door 13 and removing the film casings 36 and 47 from the respective supports 40. At any convenient or desired time after the films have been developed they may be operated through the same film actuating means for the purpose of projecting the pictures upon the screen. At this time the rear portion 11 of the casing is swung around into the dotted line position of Fig. 3 and a special reel bracket 78 is supported upon the arms 37 and 37'. The film 34 is then unwound from the reel 36' and is wound upon the roll in the reel 47', these reels being spaced sufficiently far to accommodate a lamp and condenser 79 supported upon the bracket 78 directly back of the picture field 72. The same or a similar belt 51 actuates the take-up reel 47' from the same source of power 52 as already described. Each of these last mentioned reels includes a separable disk or face held in place by the spring catches 49 on spindles 40 the same as in the other adaptation of the improvement.

The fly wheel shaft 75, being extended entirely across the casing, is adapted to have the handle 19' detachably connected thereto to enable the operator to take a single picture by making simply a single turn of the handle.

We claim:

1. In a combined moving picture camera and projector of the character indicated, the combination of a casing, a pair of reels, means to support the reels for the unwinding of the film and taking up the same, means to actuate the film between the reels, a pair of selective shutter devices, one for use in connection with the adaptation of the machine as a camera and the other for use with the machine as a projector, a member coöperating with both shutters holding them a constant distance apart, and means to rotate one of the shutters from the film operating mechanism while the other is held stationary.

2. In a combined picture machine as described, a casing, film holding and actuating means, a frame supporting the actuating means within the casing, said frame having an opening constituting a picture field, a special lens in the casing in alinement with said field, a pair of shutters arranged coaxially of each other between the lens and said picture field, one shutter being adapted for camera purposes and the other for projecting purposes, rotating means for the shutters, and means to selectively clutch one of the shutters to the rotating means to the exclusion of the other, said lens serving for both purposes.

3. In a combined moving picture camera and projector of the character indicated, the combination of a casing, a pair of reels, means to support the reels for the movement of a film from one to the other, actuating means within the casing to cause the desired movement of the film, a pair of shutters, a driving shaft therefor upon which both shutters are mounted permanently, means to clutch one of the shutters to the shaft, means to shift both shutters simultaneously lengthwise of the shaft to effect said clutching action, and means to engage and hold the unclutched shutter.

4. In a combined machine of the class set forth, the combination of a casing, film actuating means within the casing, a frame supporting the actuating means, a pair of selective shutters journaled within the frame, means coöperating with the shutters to maintain them at the same distance apart, and indicator and shifting means coöperating with the last mentioned shutter means to shift the shutters simultaneously to bring one into action and to lock the other from action.

5. In shutter mechanism for combined moving picture apparatus, the combination of a shaft, means to rotate the shaft, a pair of shutters mounted upon the shaft, a clutch member fixed to the shaft between the shutters, and means to clutch either shutter to said clutch member for rotation with the shaft.

6. In shutter mechanism for combined picture apparatus, the combination of a shaft, fixed bearing supports for the shaft, means to rotate the shaft, a pair of shutters mounted upon the shaft, a clutch member on the shaft between the shutters and rotatable with the shaft, and means to simultaneously cause one of the shutters to be connected to the clutch member for rotation and the other to be held stationary in connection with its adjacent shaft bearing.

7. In a combined moving picture camera and projector, a casing, film holding and actuating means, a pair of shutters arranged coaxially of each other, one shutter being adapted for camera purposes and the other for projecting purposes, rotating means for the shutters, and means to selectively clutch one of the shutters to the rotating means to the exclusion of the other.

FRANK MLADINICH.
AUGUSTUS R. DE TARTAS.